United States Patent

Wallace et al.

[11] 4,062,443
[45] Dec. 13, 1977

[54] SYSTEM FOR SEPARATING FERROMAGNETIC MATERIALS FROM NON-FERROMAGNETIC MATERIALS

[75] Inventors: Donald L. Wallace, Elmhurst; Wallace P. Martina, Bensenville, both of Ill.

[73] Assignee: Henry Martina, Northbrook, Ill.

[21] Appl. No.: 588,587

[22] Filed: June 20, 1975

[51] Int. Cl.² .............................................. B65G 47/00
[52] U.S. Cl. ...................................... 198/619; 209/227
[58] Field of Search ............... 209/219, 227, 231, 39, 209/223 R, 213; 198/41, 619; 318/135; 310/13

[56] References Cited

U.S. PATENT DOCUMENTS

| | | | |
|---|---|---|---|
| 282,165 | 7/1883 | Cheever | 198/41 X |
| 499,253 | 6/1893 | Sanders | 209/223 R |
| 1,441,250 | 1/1923 | Smith | 198/41 X |
| 2,056,426 | 10/1936 | Frantz | 209/214 X |
| 3,045,821 | 7/1962 | Cavanagh | 209/214 |
| 3,294,237 | 12/1966 | Weston | 209/227 X |
| 3,300,744 | 1/1967 | Deutsch | 335/268 |
| 3,376,441 | 4/1968 | Martin | 310/13 |
| 3,462,883 | 8/1969 | Reeks | 318/135 X |
| 3,493,797 | 2/1970 | Koswohl | 310/13 X |
| 3,815,511 | 6/1974 | Dukowicz | 318/135 X |

FOREIGN PATENT DOCUMENTS

| | | | |
|---|---|---|---|
| 22,731 | 11/1906 | United Kingdom | 209/214 |
| 125,206 | 1/1960 | U.S.S.R. | 209/227 |

Primary Examiner—Robert Halper
Attorney, Agent, or Firm—George H. Gerstman

[57] ABSTRACT

A mixture of ferromagnetic material and non-ferromagnetic material is separated by first conveying the mixture to an inlet of a tubular member. An electro-magnetic field is then sequentially energized along the length of the tubular member from the inlet to an outlet to attract the ferromagnetic material away from the mixture into the inlet and impel the separated ferromagnetic material through the tubular member for subsequent discharge through the outlet.

1 Claim, 3 Drawing Figures

SYSTEM FOR SEPARATING FERROMAGNETIC MATERIALS FROM NON-FERROMAGNETIC MATERIALS

BACKGROUND OF THE INVENTION

This invention relates to a method for separating a mixture of ferromagnetic material and non-ferromagnetic material and an apparatus for electromagnetically transporting the separated ferromagnetic material.

Prior art separators have included a revolving drum with a permanent magnet or an electromagnet adjacent the inner periphery of the drum. A mixture of ferromagnetic material and non-ferromagnetic material was then dropped upon the outer periphery of the drum where the non-ferromagnetic material would be deflected away from the drum, while the ferromagnetic material would be retained by the magnetic drum for subsequent discharge. However, such ferromagnetic separators have been generally inefficient, expensive and bulky.

It is therefore an object of this invention to provide a relatively efficient and inexpensive method for separating a mixture of ferromagnetic material and non-ferromagnetic material.

Another object of this invention is to provide an easy and dependable method for electromagnetically separating ferromagnetic material from non-ferromagnetic material.

A further object of this invention is to provide an open-ended tubular member carrying a plurality of sequentially-timed electromagnetic coils for separating ferromagnetic material from non-ferromagnetic material and for electromagnetically transporting the separated ferromagnetic material.

The foregoing and other objects and advantages will be apparent from the following description and appended claims taken in conjunction with the accompanying drawings.

BRIEF DESCRIPTION OF THE INVENTION

There is provided by virtue of this invention, a method for separating ferromagnetic material from a mixture of ferromagnetic material and non-ferromagnetic material. Initially, the mixture is conveyed to an inlet of a tubular member. An electro-magnetic field is then sequentially energized along the length of the tubular member from the inlet to an outlet to effect movement of the ferromagnetic material from the inlet through the outlet.

One device for transporting non-hollow pieces for ferromagnetic material includes a discontinuous tubular material of magnetic reluctant material. The tubular member is shaped to define an open inlet at one end and an open outlet at the other end. A plurality of electromagnetic coils are spaced along the length of the tubular member and are sequentially energized by solid state control circuit means. An electromagnetic field is generated about the coils by the solid state control circuit means to electromagnetically move the non-hollow pieces of ferromagnetic material through the tubular member from the inlet through the outlet with sufficient momentum to propel the non-hollow pieces of ferromagnetic material in a projectile outward of the outlet.

The device may include at least one braking coil adjacent the outlet with a polarity opposite the other electromagnetic fields, when energized by the solid state control circuit means, to reduce the velocity of the ferromagnetic material exiting the outlet.

A more detailed explanation of the invention is provided in the following description and claims and is illustrated in the accompanying drawings.

DETAILED DESCRIPTION OF THE ILLUSTRATIVE EMBODIMENT

Figure 1:
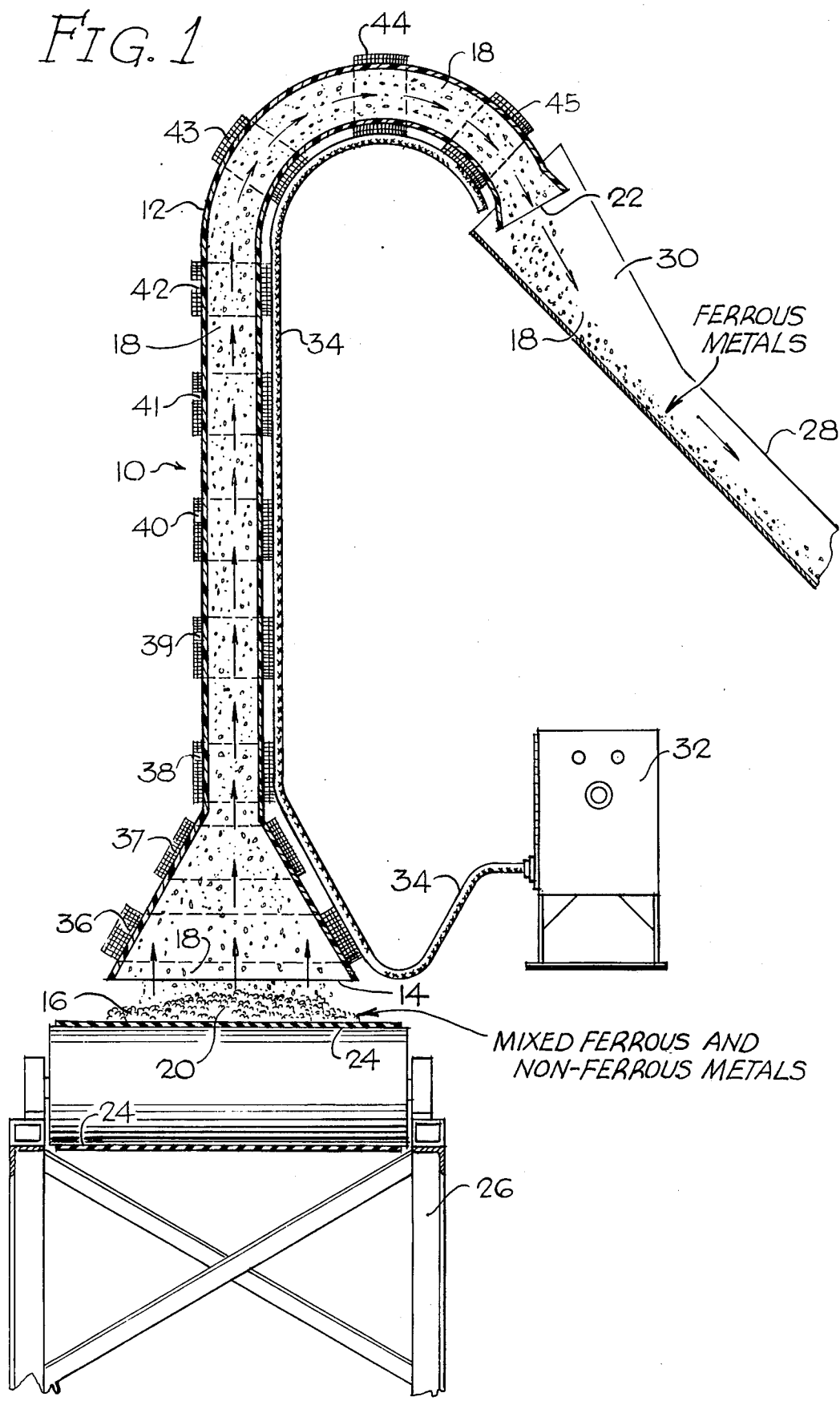
FIG. 1 is a cross-sectional view of a system for practicing a method of separating ferromagnetic materials from non-ferromagnetic materials and electromagnetically transporting the separated ferromagnetic materials in accordance with the principles of the present invention.

Referring to FIG. 1 of the drawings, a system 10 for practicing the method for separating ferrous materials from nonferrous materials and electromagnetically transporting the separated, non-hollow pieces of ferromagnetic material includes an elongated tubular member 12 formed of a magnetic reluctant or non-magnetic material such as polyurethane. Tubular member 12 is preferably annular in shape and has a frusto-conical open inlet end 14 diverging toward a mixture 16 of ferromagnetic material 18 and non-ferromagnetic material 20. It is believed that the shape of the open inlet end 14 contributes toward increasing the flow rate of ferromagnetic material 18 toward an open discharge end or outlet 22 of the tubular member 12. The open discharge end 22 is preferably frusto-conical in configuration and diverges away from the tubular member to enlarge the area of discharge.

A power-driven conveyor 24, such as an endless belt conveyor or a vibrating conveyor, transports mixture 16 from a remote area to a position in close proximity to the open inlet end 14. Power-driven conveyor 24 is supported by a support structure 26. Referring to FIG. 1, the power-driven conveyor 24 defines a first conveyor which is substantially horizontal and is positioned beneath a vertical portion of tubular member 12.

A discharge chute 28 has a frusto-conical end portion 30 of a size and dimension to fit around and couple the open discharge end 22. Discharge chute 28 slopes toward the ground for gravity flow of ferromagnetic material 18 discharged from the open discharge end 22 to a receptacle (not shown) for holding the separated ferromagnetic material 18.

Figures 2, 3:
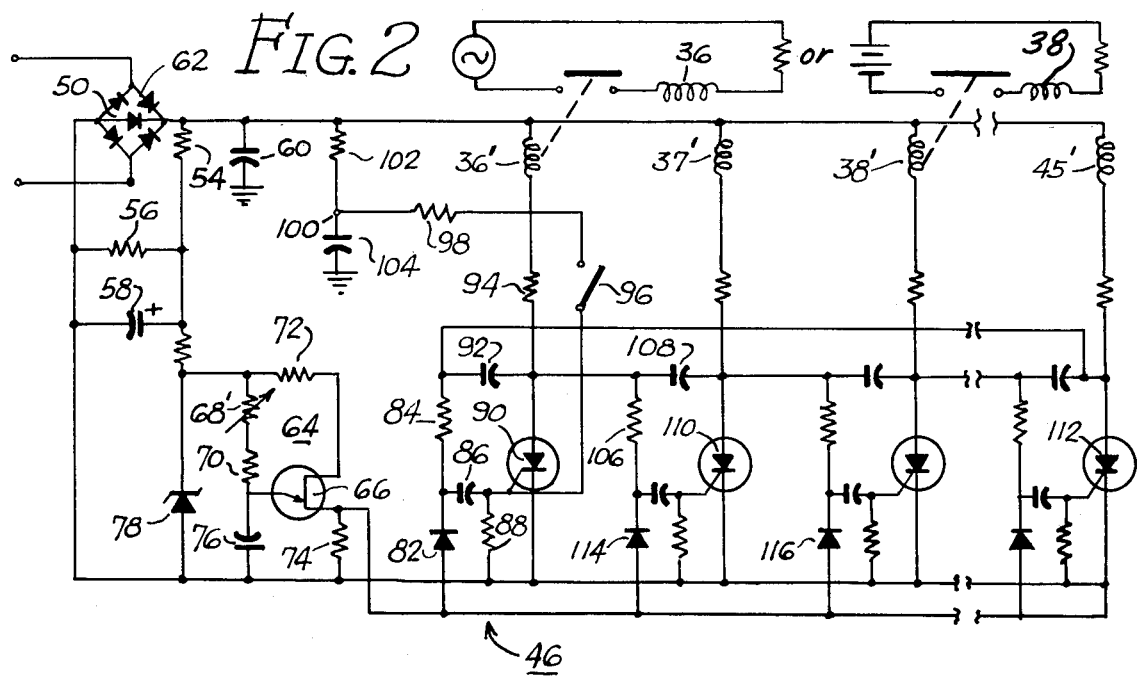
FIG. 2 is a schematic diagram of a control circuit for sequentially energizing electro-magnetic fields along the length of a tubular member used in practicing this invention.
FIG. 3 is a fragmentary cross-sectional view of a modified system for practicing the method of separating ferromagnetic materials from non-ferromagnetic materials in accordance with principles of the present invention.

Referring to the modified embodiment in FIG. 3, the power-driven conveyor 24' carries mixture 16 in a substantially horizontal plant and dispenses the mixture 16 in a generally vertical path adjacent open inlet end 14' and transverse to tubular member 12'. In this manner, the mixture is conveyed to a position above tubular member 12' and then it freely falls under the influence of gravity to a position in close proximity to inlet 14'.

A control unit 32 is connected to an electrical power line 34. Power line 34 is operatively connected to a plurality of axially spaced coils 36, 37, 38, 39, 40, 41, 42, 43, 44 and 45 carried on the outer periphery of the tubular member 12 and disposed substantially along the entire length of tubular member 12. When energized, coils 36, 37 and 38 generate an electro-magnetic field of sufficient strength to magnetically attract and remove ferromagnetic material 18 from mixture 16 and impel the removed ferromagnetic material 18 into the open inlet end 14. Control unit 32 houses a control and timing circuit 46, as shown in FIG. 2, which sequentially energizes solenoids 36–45 from the open inlet end 14 to the open discharge end 22 to generate a consecutive series of magnetic fields of sufficient strength to convey the ferromagnetic material from the open inlet end 14 through the open discharge end 22 and into the discharge chute 28.

At least one braking coil, such as coil 45, is positioned adjacent the outlet 22. The braking coil is constructed and arranged to provide a polarity opposite the other electromagnetic coils so as to reduce the velocity of the ferromagnetic material exiting outlet 22.

Referring to FIG. 2, circuit 46 is shown therein and includes a conventional full wave rectifier 50 for rectifying the AC input. The DC (rectified AC) is fed to voltage divider resistors 54 and 56, filter capacitors 58 and 60 and diode 62, as shown in FIG. 2.

A unijunction transistor oscillator 64 is provided comprising a unijunction transistor 66, timing control resistor 68, timing limit resistor 70, base load resistors 72 and 74, and an oscillating timing capacitor 76. A zener diode 78 and resistor 80 provide the appropriate voltage regulation for the oscillator 64.

Coils 36–45 of FIG. 1 are coupled to relays 36'–45' respectively, which, when energized, close an AC circuit to a respective coil. This energization of relay 36', for example, effectively causes AC to flow through coil 36. Likewise, energization of the other relays effectively causes AC to flow through their respective coils. If a braking coil as described above is used, it will be apparent that direct current instead of AC should be applied to the coils, as illustrated as an alternative in FIG. 2.

A silicon control rectifier circuit is provided for each relay. Since each of the SCR circuits is identical to the other, the SCR circuit for load 36', including SCR 90, will be the only one described in detail herein.

Base 80 of unijunction transistor 66 is connected to the anode of a steering diode 82, the cathode of which is connected to steering diode load resistor 84 and trigger pulse coupling capacitor 86. Capacitor 86 and gate load resistor 88 are connected to the gate of SCR 90. The cathode of SCR 90 is connected to ground and the anode is connected to commutating capacitor 92 and resistor 94, which resistor 94 is connected to relay 36'.

Also connected to the gate of SCR 90 is a line including start switch 96 and voltage divider trigger resistor 98, with this line being connected at junction 100 to filter resistor 102 and start circuit filter capacitor 104. The anode of SCR 90 is also connected to steering diode load resistor 106 and commutating capacitor 108 of the next SCR circuit which includes SCR 110. The junction of resistor 84 and capacitor 92 is connected to the anode of the last SCR circuit which includes SCR 112, whereby the ring action is obtained.

Oscillator circuit 64 operates as follows. As the DC is applied to circuit 64, capacitor 76 charges until the DC level is such that unijunction transistor 66 turns on. The turning on of unijunction transistor 66 allows capacitor 76 to discharge through resistor 74, and such discharge will continue until the voltage level at capacitor 74 is such that transistor 66 turns off. Capacitor 76 will again begin charging, thus providing the oscillatory action.

The discharging of capacitor 76 through unijunction transistor 66 and resistor 74 will develop positive voltage pulses across resistor 74 that are applied to steering diode 82 (and the other steering diodes for the other SCR circuits). The frequency of the pulses is determined by the values of capacitors 76 and resistors 68, 70 and 72.

When start switch 96 is closed, capacitor 104 discharges through resistors 98 and 88. The positive potential developed at resistor 88 by the discharging of capacitor 104 is applied to the gate of SCR 90 and renders SCR 90 conductive. Current through SCR 90 activates relay 36' to close the AC circuit to coil 36 thereby allowing AC to pass through coil 36. Because the next steering diode 114 is connected to the anode of SCR 90 through resistor 106, the reverse bias applied to diode 114 will be lowered as SCR 90 conducts. The positive pulse developed by oscillator 66 is applied to diode 114 thereby rendering SCR 110 conductive and causing energization of relay 37'. Conduction of SCR 110 causes capacitor 108 to reverse bias SCR 90 thereby rendering SCR 90 non-conductive. Since SCR 110 is conducting, the anode voltage falls to a lower value, this level being applied to the next steering diode 116 which again removes some of the reverse bias of diode 116. The operation of the succeeding SCR circuits becomes evident from the previous discussion.

Now that the control and timing circuit 46 has been described, the operation of the system for separating a mixture of ferromagnetic material and non-ferromagnetic material will be described.

In operation, the mixture 16 of ferromagnetic material 18 and non-ferromagnetic material 20 is carried by the power-driven conveyor 24 from a remote area to a position in close proximity to open inlet end 14. Start switch 96 is closed and coils 36–45 are sequentially energized by control and timing circuit 46 to magnetically attract and remove the ferromagnetic material 18 from mixture 16. Thus the removed ferromagnetic material 18 is driven electromagnetically through the internal path formed by the tubular member 12, for subsequent discharge through the open discharge end 22. After the ferromagnetic material 18 has been removed, the power-driven conveyor 24 conveys the non-ferromagnetic material 20 away from the open inlet end 14. From the foregoing, the operation of the FIG. 3 embodiment is apparent.

If desired, the material remaining on conveyor 24 (which material is primarily non-ferromagnetic but which may include some ferromagnetic material that has not been separated) could be recirculated for one or more separations, in order to increase the proportion of ferromagnetic material that is removed.

System 10 for separating ferrous materials from non-ferrous materials can be used to convey, position, stack or receive a pile of ferrous material. Furthermore, system 10 could be used for separating ferrous from non-ferrous scrap materials, such as separating undesired metal chips and other non-hollow metal particles from a bored finished product, as well as for use in the scrap metal reclamation industry.

Although illustrative embodiments of the invention have been shown and described, it is to be understood that various modifications and substitutions may be made by those skilled in the art without departing from the novel spirit and scope of the present invention.

What is claimed is:

1. A device for transporting non-hollow pieces of ferromagnetic material, comprising, in combination:
   a tubular member of magnetic reluctant material having an open inlet at one end and an open outlet at the other end;
   a plurality of electromagnetic coils spaced along the length of the tubular member;
   solid state control circuit means operatively coupled to the electromagnetic coils for sequentially energizing said coils with direct current to provide an electromagnetic field sequentially about said coils from said inlet to said outlet to electromagnetically move the non-hollow pieces of ferromagnetic material along a path through the tubular member from said inlet through said outlet with sufficient momentum to propel the non-hollow pieces of ferromagnetic material outward of said oulet; said electromagnetic coils including at least one braking coil adjacent the oulet with a polarity opposite the other electromagnetic coils when energized by said circuit means so as to reduce the velocity of the ferromagnetic material exiting said outlet.

* * * * *